Aug. 4, 1953
M. T. HOFFMAN
2,647,286
TREATMENT OF TEXTILE FIBERS FOR REMOVING FOREIGN MATTER THEREFROM
Filed Nov. 18, 1946
3 Sheets-Sheet 1
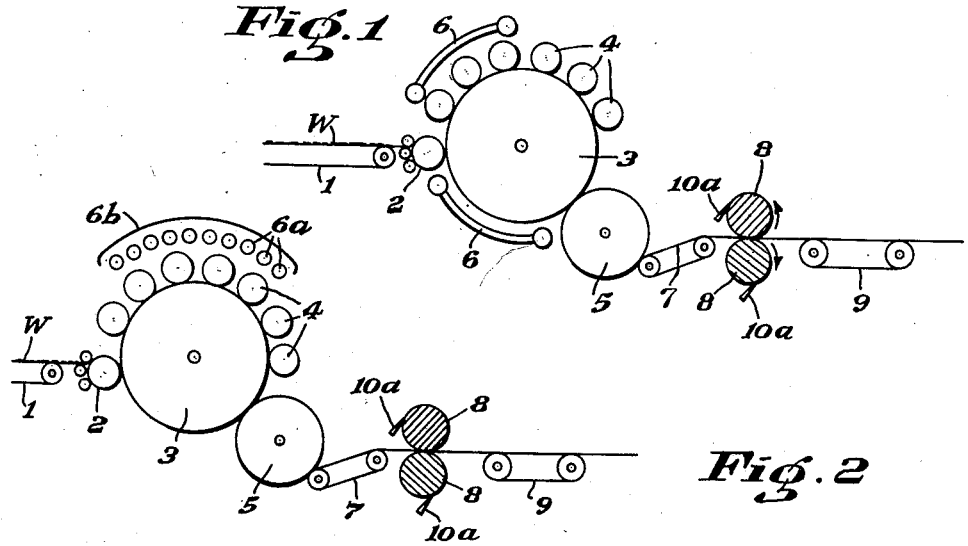
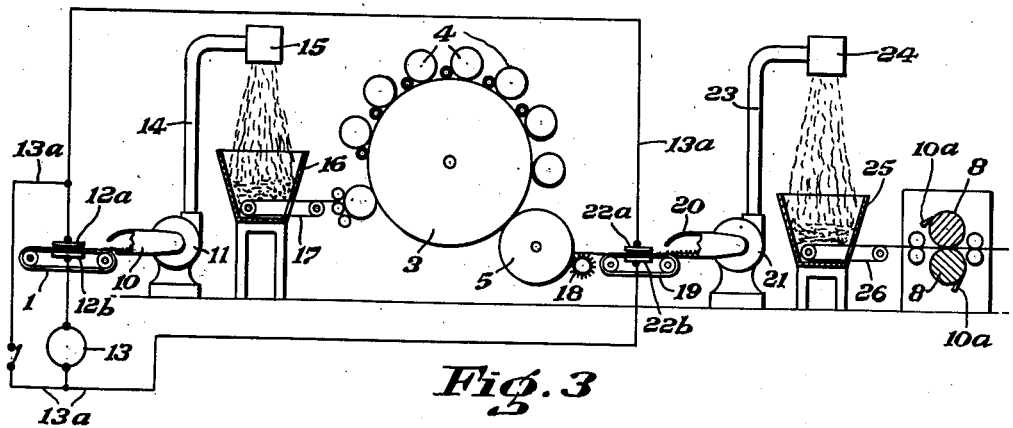
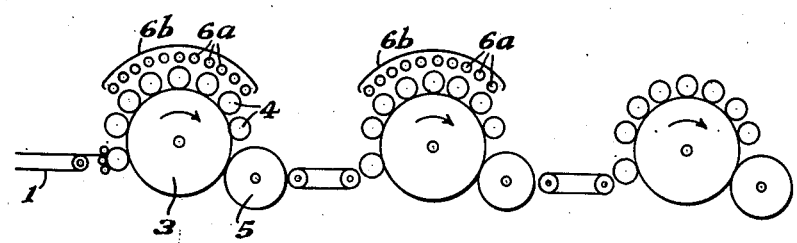
INVENTOR.
Manfred T. Hoffman

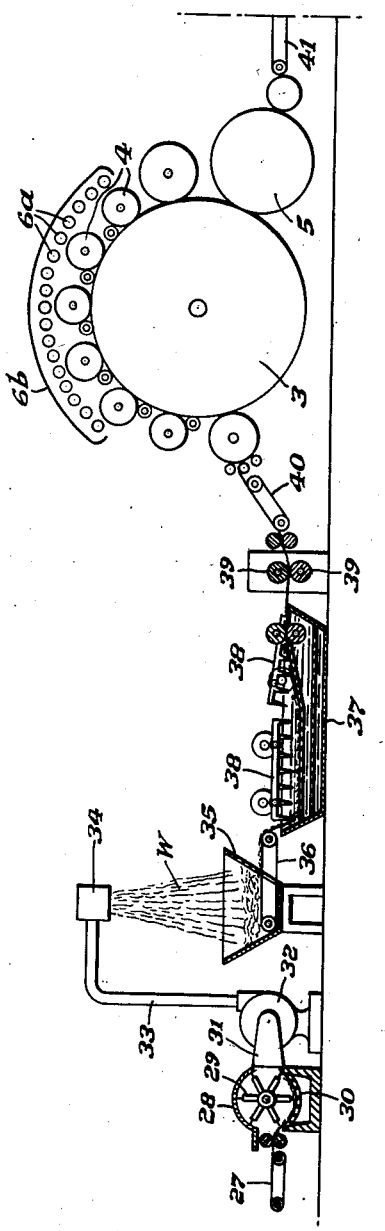
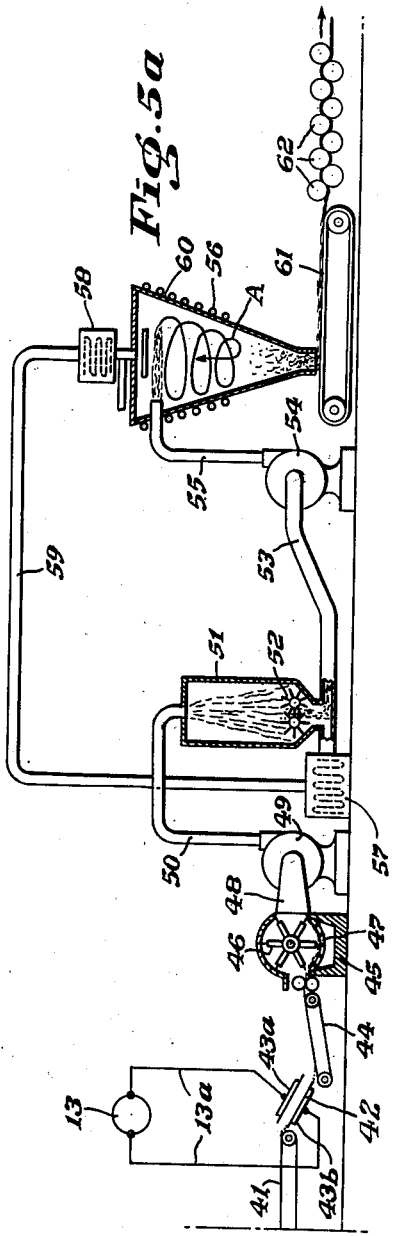

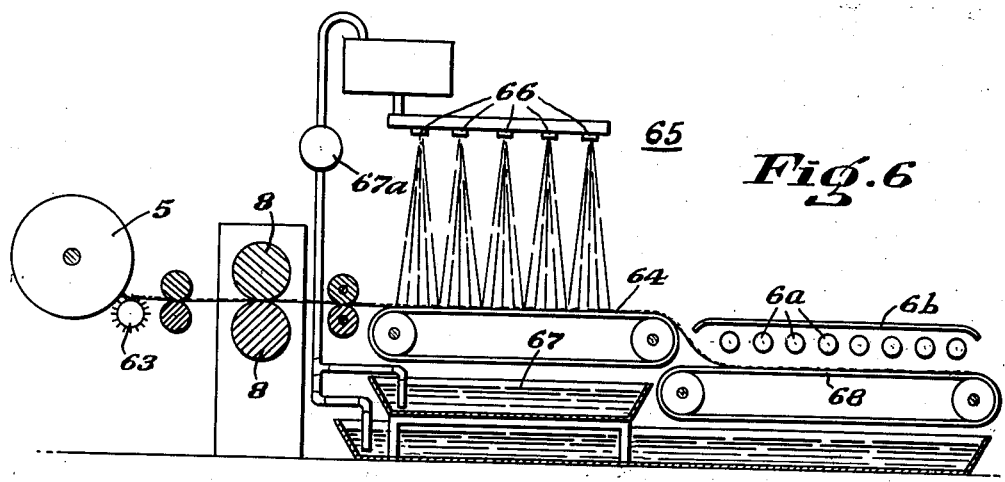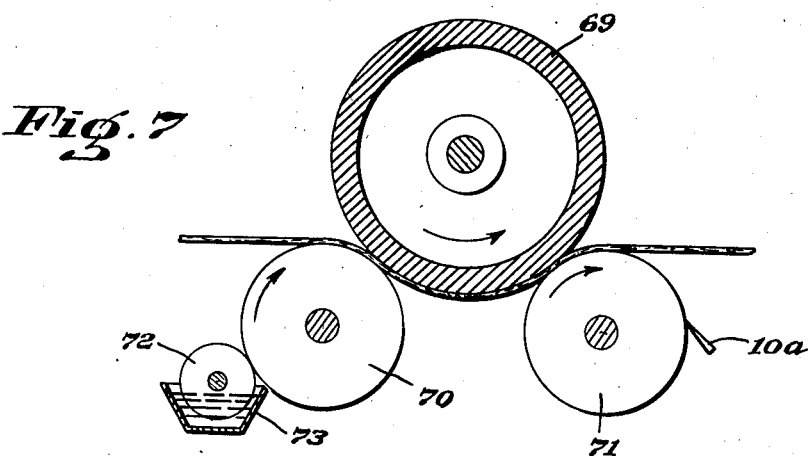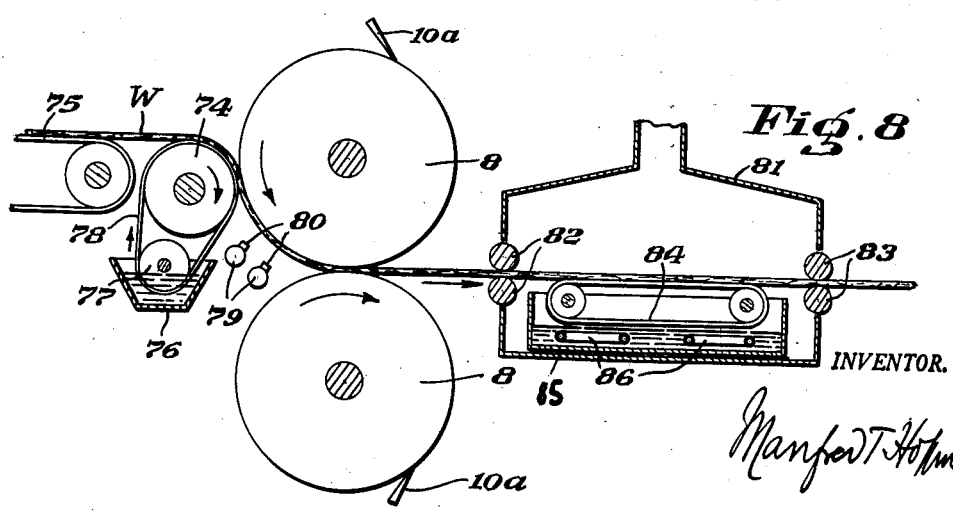

Patented Aug. 4, 1953

2,647,286

UNITED STATES PATENT OFFICE 2,647,286

TREATMENT OF TEXTILE FIBERS FOR REMOVING FOREIGN MATTER THEREFROM

Manfred T. Hoffman, Newburyport, Mass.

Application November 18, 1946, Serial No. 710,563

2 Claims. (Cl. 19—66)

The present invention concerns the treatment of textile fibers for removing foreign matter of an organic or vegetable nature therefrom. It concerns in particular the removal of organic or vegetable foreign matter from any kind of wool such as, for instance, raw wool, wool waste known as shoddy and mungo, wool blends and the like. Raw wool contains natural cellulosic substances such as shives and burrs, while processed wool often contains cellulosic substances such as cotton or rayon threads. It is often desirable to remove such foreign matter from wool and similar animal fibers by an operation known as "acid carbonizing," whereby foreign matter of organic or vegetable nature is converted into a friable state in which it can readily be removed from the fibers.

The main object of the present invention is to provide an improved process for carbonizing fibers.

Another object of the invention is to improve the penetration of heat into the acid-wet fibers and to concentrate heating on cellulosic impurities sought to be removed from the fibers.

Still other objects of the invention are to increase the effectiveness of the carbonizing process, to achieve, during the carbonizing process, a more uniform spatial distribution of temperature among the fibers, to carbonize foreign matter extremely rapidly at relatively high temperatures without injury to the fibers, and to preserve the felting properties of the fibers which are subjected to the carbonizing process.

Further objects of the invention consist in providing means for re-carbonizing carbonized fibers in order to eliminate as completely as possible any particles of shives, burrs etc. which have not been sufficiently affected during the initial carbonizing process, and to provide mechanical means for converting the remaining unpulverized part of foreign matter in the carbonized fibers to dust.

Other objects of the invention will become apparent as this description of the invention progresses.

I have discovered that when subjecting loose acidified fibers in form of a thin layer to heating, the effectiveness of the carbonizing reaction of the acid with the cellulosic foreign matter and the speed of reaction is considerably increased. This, in turn, remarkably improves the quality of the wool, especially in regard to felting property. Excellent results may be obtained by subjecting fibers to a carbonizing reaction while in the form of a web produced by a carding machine. The carbonizing reaction, if carried out on a thin layer or thin web of loose fibers, is so effective that most of the carbonized foreign matter is readily removed in a carding operation following the carbonizing process. Since loose fibers form a thin web when running through a carding machine, such a machine may be supplied with acid-wet, i. e. soaked and then extracted or squeezed fibers which, while in the process of being carded, may be subjected to a temperature sufficient to carbonize organic foreign matter contained therein. The moisture content of the acid-wet fibers decreases from about 35% at the feed end down to about 15% on the doffer. In order to heat the fibers to carbonizing temperature while being carded, the carding machine may be provided with radiators which are supplied with steam. The carding machine may also be heated by means of electric resistance heating elements or an attachment of infrared heating bulbs. There is a possibility that thin web-carbonized and carded wool may still contain a small yet undesirable quantity of cellulosic impurities. Since the wool still contains some carbonizing acid, residual impurities may be removed from it by subjecting it, without previous additional acid wetting, to a second carbonizing reaction on following card cylinders. The wool, after having been carbonized in the form of a thin layer or web once, twice, or even three times, is then subjected to pressure adapted to crush the remaining unpulverized part of foreign matter to dust.

I have discovered that particularly good results may be obtained when acid-wet fibers are moved through a high frequency electric field adapted by its heating action upon acidulated cellulosic foreign matter to effect carbonization thereof. In the requisite heat for carbonizing is provided by a strong high-frequency electric field, the acid-wet fibers need not necessarily be arranged during carbonizing in form of a thin web. High-frequency heating permits to heat a relatively thick or compact layer or mass of fibers such as, for instance, that coming from a so-called wool-picker, uniformly throughout. When the heat requisite for carbonizing acid-wet fibers is provided by high-frequency electrostatic heating, which is also known as dielectric heating, a concentration of heat midway between the electrodes has sometimes been observed. In such cases, in order to obtain more uniform heat distribution, the outer zones of the acid-wet fibers situated relatively near to the electrodes of the high-frequency electric field may be subjected to the effects of other sources of heat in addition to those of the high-frequency electric field. It has proved to be necessary or advantageous to electrically and thermally insulate the electrodes from the acid-wet fibers. Good thermal insulation will keep conduction and convection losses to a minimum. Temperatures up to about 500° F. are not harmful to wool fibers if they are not exposed too long to such temperatures. The shorter the exposure, the faster production can be effected.

After being thoroughly carbonized, crushed and dusted, the wool is either neutralized, or rinsed. In special cases it may be used with the remaining acid left in it.

The accompanying drawings illustrate embodiments of the application of the process according to the present invention.

Figs. 1 to 3 are diagrammatic side elevations of cards and crush rolls adapted to practice the process of the invention;

Fig. 4 is a similar diagram showing the use of a plurality of carding cylinders;

Figs. 5 and 5a are diagrammatic views, partially in side elevation, partially in vertical section, of a wool cleaning and carbonizing system, Fig. 5 showing one end and Fig. 5a the other end thereof;

Figs. 6 to 8 are diagrammatic views of three other wool cleaning systems.

Referring to Fig. 1 of the drawing, loose wool W to be carbonized, which may be supplied, for instance, by a so-called woolpicker, is carried by a feed apron 1 to the licker-in 2 of a carding machine comprising the carding cylinder 3, a number of workers and strippers 4 and the doffing cylinder 5. The wool with which the carding machine is supplied by the feed apron 1 is acid-wet, excess acid having previously been removed by extracting or squeezing. The carding cylinder 3 is heated by two radiators 6 forming part of a steam heating system (not shown). Sufficient heat is applied to the carding cylinder 3 by radiators 6 and/or by other means to raise the temperature of the thin web of loose fibers formed on the carding cylinder 3 and of all impurities contained therein to carbonizing temperature, i. e. to at least approximately 200° F. Thus the wool is carbonized while forming a thin web and the vegetable matter is freely exposed to heat, whereby penetration of heat to all foreign matter as well as obtaining uniform carbonizing conditions is greatly facilitated. The feeding apron 7 carries the carbonized wool into the nip of the cylinders 8 of a crushing machine, for instance, a so-called "Peralta" crushing machine as disclosed in U. S. patent to Antonio Peralta Albero, No. 2,075,156 dated March 17, 1937. The upper cylinder of the crushing machine exerts heavy pressure upon the carded and carbonized web whereby remaining unpulverized but now dry and brittle foreign matter is crushed to dust, thus facilitating its subsequent removal. The crushed fibers are carried away by the apron 9 to a dusting device of any conventional type, not shown in the drawing.

The structure shown in Fig. 2 is very similar to that shown in Fig. 1 and since the same reference signs have been applied in both figures to like parts, Fig. 2 does not require any description inasmuch as it is identical with Fig. 1. In the arrangement shown in Fig. 2 the acid-wet fibers which form a loose web-like layer on the carding cylinder 3 is irradiated with infra-red rays by a bank 6a of heat-radiating infra-red bulbs. The bulbs forming the bank 6a are so distributed as to constitute a substantially uniform intense source of heat which, in combination with the feature of spreading loose fibers so as to form a thin web, permits to effect carbonizing at a more rapid rate than heretofore believed to be possible. Concentration of the infra-red rays upon the fiber web is effected by means of a reflector 6b which covers the bank 6a of heat radiating bulbs.

Fig. 3 illustrates a process for carbonizing organic matter in fibers in two consecutive steps or stages, one preceding carding and one being effected upon carding. In that particular process a thin web of loose pre-carbonized fibers is formed on the carding cylinder 3. Pre-carbonization results in reducing a substantial amount of foreign cellulosic matter to a more or less pulverulent state. If pre-carbonized fibers are subsequently treated in the carding machine, whereby their original relationship or lie to each other is re-arranged, this results in a removal of the carbonized cellulosic foreign matter. Upon being carded and before being subjected to a crushing action between the rolls 8 of a crushing machine, the web is subjected to a second heat treatment. That second heat treatment has a dual purpose. First, there is a likelihood that residual cellulosic foreign matter which has not been carbonized will be carbonized during the second heat treatment of the fiber web, and second that heat treatment causes certain foreign matter such as, for instance, tar, to soften and/or melt and in that state it will tend to adhere to the surfaces of the crush rolls 8 and may continuously be removed therefrom by scrapers or similar devices.

Either of the two consecutive carbonizing reactions can be effected by means of high-frequency electrostatic heating and the arrangement shown in Fig. 3 comprises means for effecting both carbonizing reactions by that particular heating method. Acid-wet wool, after being opened in a so-called wool-picker (not shown), is delivered to a feed apron 1. Two electrodes 12a, 12b which form an electric condenser are arranged adjacent opposite surfaces of the feed apron 1. Both electrodes 12a, 12b may be covered with a layer of insulating material (not shown) for electrically and thermally insulating the electrodes from the inter-electrode space. The acidulated wool is continuously conveyed through condenser 12a, 12b by feed apron 1. The potential of the high frequency generator 13 is applied by means of conductors 13a across the condenser electrodes 12a, 12b so that the wool, while being conveyed through the inter-electrode gap, is subjected to the heating action of a high-frequency electric field. Feed apron 1 delivers pre-carbonized wool to the intake flue or suction inlet pipe 10 of a fan 11. Fan 11 forces the wool through an exhaust pipe 14 to a ceiling condenser 15 from which it falls into feed box 16. An apron 17 conveys the fibers from feed box 16 to a carding machine which comprises the cylinder 3, workers 4 and a doffing cylinder 5. The re-arrangement of fibers which is effected in the course of the carding process results in a substantial removal of carbonized foreign cellulosic matter. Then the wool is tripped from doffing cylinder 5 by a rotating comb 18 and passes to an apron 19 which conveys it to the intake flue 20 of fan 21. Two electrodes 22a, 22b which form an electric condenser are arranged adjacent opposite surfaces of feed apron 19. The electrodes 22a, 22b may be covered with an insulating layer (not shown)

for electrically and thermally insulating the electrodes from the inter-electrode space. The acidulated, pre-carbonized and carded wool in form of a thin fiber-web is continuously conveyed through condenser 22a, 22b by means of conductors 13a so that the wool, while being conveyed through the inter-electrode gap, is subjected to the heating action of a high frequency electric field. Fan 21 forces the wool through an exhaust pipe 23 to a ceiling condenser 24 from which it falls into feed box 25. Apron 26 conveys the fibers from feed box 25 into a group of crushing cylinders 8 of a crushing machine for pulverizing the remaining part of foreign matter to dust and removing other impurities such as, for instance, tar and pigments.

The excellent results which have been achieved by carbonizing fibers in a high-frequency electric field are probably due to the fact that when applying this particular process a concentration of the energy expended in heat is effected at the particular points where the reaction between the cellulosic foreign matter and the acid is to take place, no heat being wasted to raise the temperature of the spaces or interstices between the individual fibers where no heating effect is needed. It is possible to increase the carbonizing temperature above the temperature applied in case of steam heating of the fibers without injury to the fibers, at the same time greatly shortening the period of time needed for carbonizing foreign matter. Thus particles of foreign matter may be heated to approximately 450° F. or even higher.

The carding machine shown in Fig. 4 has three cylinders, single breaker and double finisher. The first carding set is supplied by an apron 1 with acidulated, squeezed or extracted, but still acid-wet wool. Drying and carbonization of the wool is effected while on the breaker and while on the first finisher card. These cards are advantageously covered with cadmium-plated cardwire and are provided each with a bank 6a of heat-radiating infra-red bulbs which is backed by a reflector 6b. Vegetable impurities are thus charred and converted into a friable condition which permits their being readily removed as they pass through the second finisher card.

Referring now to Fig. 5, raw wool is carried by apron 27 to an opener 28 of conventional construction wherein the fibers are pulled apart by a toothed rotor 29 operating against a grid 30. From opener 28 the fibers are sucked into the entrance flue 31 of a fan 32 which forces the fibers through an exhaust pipe 33 to a ceiling condenser 34 from which they fall into a feed box 35. The above described operations are conducive to loosening up the mass of fibers preparatory to treatment with carbonizing acid. Apron 36 conveys the loosened up mass of fibers to a scouring bowl 37 containing a bath of aqueous carbonizing acid as, for instance, sulfuric acid. Moving rakes 38 progress the wool along the scouring bowl 37 from where it is passed to the nip of squeeze rolls 39 for removing excess acid. The wool which has been squeezed between rolls 39 is still acid-wet when it is passed to apron 40. Apron 40 feeds the wool to a card comprising the cylinder 3 and workers 4. The card is provided with a bank 6a of infra-red rays emitting bulbs backed by a reflector 6b for subjecting the wool, as it is passed through the card, to a drying and pre-carbonizing action. Upon being carded and pre-carbonized the wool is stripped from the doffer 5 and the web carried forward by an apron 41 to a condenser chute 42. Condenser chute 42 proper is made of an insulating material, e. g. a urea resin laminate, and is provided on its outside with electrode plates 43a, 43b. The electrode plates 43a, 43b are connected by conductors 13a to a high-frequency generator 13 of a conventional design as used in the art for the purpose of drying cotton or tobacco. As the wool passes through condenser chute 42 it is subjected to a strong heating effect occurring right on the acidulated impurities contained in the wool fibers. Thus the wool is subjected to a second intense carbonizing reaction and is then conveyed by apron 44 to an opener 45 comprising rotor 46 and grid 47. The wool then progresses into the intake flue 48 of a fan 49 which conveys it through pipe 50 into the hopper 51. Hopper 51 is provided at its bottom end with a gate valve 52 designed and adjusted for permitting the passage of fibers at a predetermined rate. The wool, upon having passed gate valve 52, is sucked into the entrance flue 53 of a fan 54 which forces the wool through an exhaust flue 55 to a heat cyclone 56. A third carbonizing reaction and virtually complete drying of the wool is effected in the cyclone 56 as more fully set forth in my copending application Serial No. 579,271, filed February 22, 1945, for Method for Treatment of Wool, and other Fibers.

The cyclone 56 has essentially the shape of an inverted cone forming a chamber wherein the acidulated wool is floated in a current of hot air. The air is heated by two heat exchangers 57, 58 which are serially arranged in the path of air circulating through entrance flue 53, fan 54, exhaust flue 55, cyclone 56 and return pipe 59. Hot air exhausting from pipe 55 enters into the cyclone 56, whirls about the walls thereof in a downwardly spiralling path indicated by the arrow line A, forming a vortex near the wall. This stream of hot air carries with it in suspension acidulated and precarbonized fibers and whatever foreign matter still may cling thereon. At the base of the vortex some of the air stream turns upwardly inside the vortex and returns through pipe 59. If it is desired to increase the heating action upon the floating mass of fibers, cyclone 56 may be provided with heating means such as, for instance, a jacket of steam pipes 60. The fibers which are released from the cyclone 56 are substantially dry. As they drop through the cyclone's restricted throat they are collected by an apron 61 and carried to a bank of crush rolls 62. The fibers are subjected between the crush rolls 62 to pressure whereby the remaining unpulverized part of foreign matter is crushed to dust. Upon having left the bank of crush rolls 62 the fibers are carried to a duster (not shown in the drawing) where virtually all the remaining foreign matter is removed and the wool cleaning process thus completed.

In the arrangement which is shown in Fig. 6 the wood to be carbonized and including the usual impurities to be extracted, is shown at the left hand end of that figure on the doffer 5 of a carding machine. Upon being removed from the doffer 5 by a rotating comb 63 the fibers pass into the nip of cylinders 8 of a crushing machine which may be of the so-called "Peralta" type or capable of performing a crushing action of substantially the same nature as a so-called "Peralta" machine. Upon a thorough splitting, crushing and breaking down of vegetable impurities in the crushing machine the fiber web is conveyed to an apron 64 which is arranged below a sprinkler system generally indicated by reference 65. While the fiber web is being conveyed by apron 64 it is acidified by a plurality of spray nozzles 66. Excess acid is collected in the bowl 67 and circulated by the pump 67a to be reused in the sprinkler system 65. The acid-wet web is transferred from apron 64 to another apron 68, where it is subjected to intense infrared radiation from a bank 6a of infrared radiating bulbs backed by reflector 6b, whereby the web is heated to carbonizing temperature. Crushing of the web prior to carbonizing reduces the size of the impurities and results in a relative increase of the total magnitude of their surface, resulting in greatly facilitating the subsequent carbonizing reaction.

It will be understood that acidifying of the wool can be effected in various ways without departing from the present invention. Acidifying can, for instance, as shown above be effected by spraying the wool with a solution of carbonizing acid. Where wool is blended in a picker before being carded it is often sprayed with an emulsion of water and oil, whereby it becomes better adapted for the subsequent carding operation. In this particular process carbonizing acid may be substituted for the conventional water and oil emulsion, and in that case other methods of acidifying the fibers may be dispensed with.

The wool heating system shown in Fig. 7 comprises a crush roll 69 which is preferably adapted to be heated by steam. For that purpose crush roll 69 may be hollow and provided with means (not shown) for circulating steam through it, as is well known in the art. Crush roll 69 cooperates with rolls 70 and 71. There may be a slight clearance between rolls 69 and 70, but rolls 69 and 71 are firmly pressed together as, for instance, by hydraulic or spring means, so as to exert a powerful crushing action upon any foreign matter contained in a web which is passed through the nip formed between rolls 69 and 71. Roll 72 rotates within a bowl 73 containing carbonizing acid and transfers carbonizing acid from said bowl to roll 70 upon which the carbonizing acid is deposited in the form of a thin film. A fiber web is passed first between rolls 69 and 70 and thereupon between rolls 69 and 71. While in contact with roll 70 the web is acidified and while being conveyed through the space between the nip formed between rolls 69, 70 and that formed between rolls 69 and 71 a carbonizing reaction takes place owing to the relatively high temperature prevailing in that zone. Internal steam heating of crush roll 69 may be sufficient to obtain carbonizing temperature at the carbonizing zone, yet it may be desirable to supplement or substitute that particular heating means by other heating means. For instance, in the same way as shown in other figures, a bank of infrared radiating bulbs may be used for heating the web to the carbonizing temperature while passing through the zone situated between rolls 70 and 71. Pigments, tar and similar impurities which, when heated, are in a low viscosity plastic state, will be removed by scraper 10 before regaining a state of higher viscosity by reason of re-cooling, while non-thermoplastic foreign matter such as shives and burrs will be substantially pulverized when the web is passed between rolls 69 and 71.

Fig. 8 shows how an arrangement of crush-rolls of the kind disclosed in U. S. Patent 2,075,156 to Antonio Peralta Albero may be adapted for web carbonizing. The crush-rolls 8 are pressed upon each other by any suitable means as, for instance, spring means not shown in the drawing. Roll 74 is arranged in front of the upper roll 8 and apron 75 conveys the web W to the nip formed between rolls 74 and 8. Bowl 76 is filled with carbonizing acid and roll 77 dips into the acid. Applicator belt 78 is wound about rolls 74 and 77 and forms a continuously moving acid collecting surface. Web W is caused to come into engagement with the film of carbonizing acid formed upon belt 78. Upon having passed through the nip formed between roll 74 and the upper crush roll 8 the web W is caused to pass through the nip formed between the upper and the lower crush-roll 8. Carbonizing is effected on the surface of the upper crush-roll 8 between the nip formed between roll 74 and upper crush-roll 8 and the nip formed between the two crush-rolls 8. While any suitable means may be used for raising the temperature of the impurities contained in the web W to carbonizing temperature, I have shown in Fig. 8 a heating means consisting of two pipes 79 of which each is fitted with nozzles 80 for projecting jets of hot air against the surface of the upper crush-roll 8. These jets of hot air have a dual function inasmuch as they cause web W to be subjected to a temperature sufficiently high to effect carbonization of cellulosic foreign matter which is contained therein and, in addition thereto, tend to support web W and to keep it in close contact with the surface of the upper crush-roll 8 which, if desired, may be provided with internal heating means. Upon carbonizing, the web W is subjected, while passing between crush-rolls 8, to pressure adapted to crush unpulverized foreign matter to dust. Scrapers 10a of hard steel remove impurities from rolls 8a which tend to adhere to their smooth surfaces.

Acid which is still contained in web W upon its passage through crush-rolls 8, i. e. which has not been squeezed out, may be removed by a suitable neutralizer as, for instance, alkali. Fig. 8 shows in a diagrammatic way means for neutralizing excess acid comprising a neutralizing chamber 81, two pairs of rolls 82 and 83, an apron 84 for the web W, a bowl 85 containing ammonia and heating coils 86 arranged within bowl 85. Heating coils 86 cause substantial evaporation of ammonia from bowl 85, resulting in neutralizing of whatever acid remained in web W. In the arrangement shown the neutralizing operation is particularly effective by reason of the fact that it is carried out while the fibers are arranged in the form of a web, whereby any points of the fibers are exposed to the action of the fumes of ammonia.

It will be understood by any person skilled in the art that the process according to the present invention can be practiced with any acids or mixtures of acids capable of carbonizing cellulosic substances without adversely affecting fibers of animal origin. Many such acids or mixture of acids are well known in the art. Sulphuric acid and hydrochloric acid are in general use for carbonizing fibers of animal origin.

The carbonizing temperature, i. e. the temperature at which the carbonizing reaction takes place, may vary within a wide range. As previously stated, the carbonizing temperature is at least approximately 210° F., and as also previously stated, temperatures up to about 500° F. are not harmful to wool fibers if they are not exposed too long to such temperatures. While these figures are indicative of the range of temperatures within which my invention may be practiced, they are given by way of illustration rather than limitation of my invention.

The required pressure for crushing the web previous to carbonization or after carbonization varies depending upon the amount, the exact nature and the size of the impurities contained in the fibers, and the number and the kinds of steps applied for their removal. It is a mere matter of adjustment of the crush-rolls not involving any complicated experimentation to determine the right amount of pressure required in any particular case.

Some of the subject-matter disclosed but not claimed in my present application has been claimed in my co-pending application Methods for Treatment of Wool and other Fibers Ser. No. 579,271, filed February 22, 1945, now abandoned.

Although only some embodiment of the present invention have been illustrated and described, it will be apparent to those skilled in the art that various changes and modifications may be made therein without departing from the spirit of the invention or from the scope of the appended claims.

It is claimed and desired to secure by Letters Patent:

1. The process of treating animal fibers to remove cellulosic foreign matter therefrom which includes the steps of acidifying the fibers with carbonizing acid of sufficient concentration to effect carbonization of the fibers upon subsequent heating thereof, carding the acidified fibers, and heating the fibers while being carded to a sufficiently high temperature for a sufficiently long period of time to convert cellulosic foreign matter into carbon.

2. The process of removing foreign cellulosic matter from fibers of animal origin which includes the steps of wetting the fibers with carbonizing acid of sufficient concentration to effect carbonization of the fibers upon subsequent heating thereof, carding the fibers while acid wet, heating the fibers while being carded to a sufficiently high temperature for a sufficiently long period of time to convert cellulosic foreign matter into carbon, and thereafter subjecting the fibers to pressure adapted to crush the remaining part of said foreign matter to dust.

MANFRED T. HOFFMAN.

References Cited in the file of this patent

UNITED STATES PATENTS

| Number | Name | Date |
|---|---|---|
| 142,063 | Waring | Aug. 19, 1873 |
| 174,500 | Eastwood | Mar. 7, 1876 |
| 270,992 | Snoeck | Jan. 23, 1883 |
| 307,161 | Bailly | Oct. 28, 1884 |
| 380,599 | Schrebler | Apr. 3, 1888 |
| 1,326,161 | Allsop et al. | Dec. 30, 1919 |
| 1,864,718 | Feibelmann | June 28, 1932 |
| 2,379,653 | Ridley | July 3, 1945 |
| 2,463,272 | Hoffman | Mar. 1, 1949 |